(No Model.) 2 Sheets—Sheet 1.

J. L. GEIER.
MEASURING OIL TANK.

No. 360,289. Patented Mar. 29, 1887.

Witnesses.
W. Rossiter
Otto Lubkert

Inventor,
John L. Geier
By, Wm. H. Lotz
Atty.

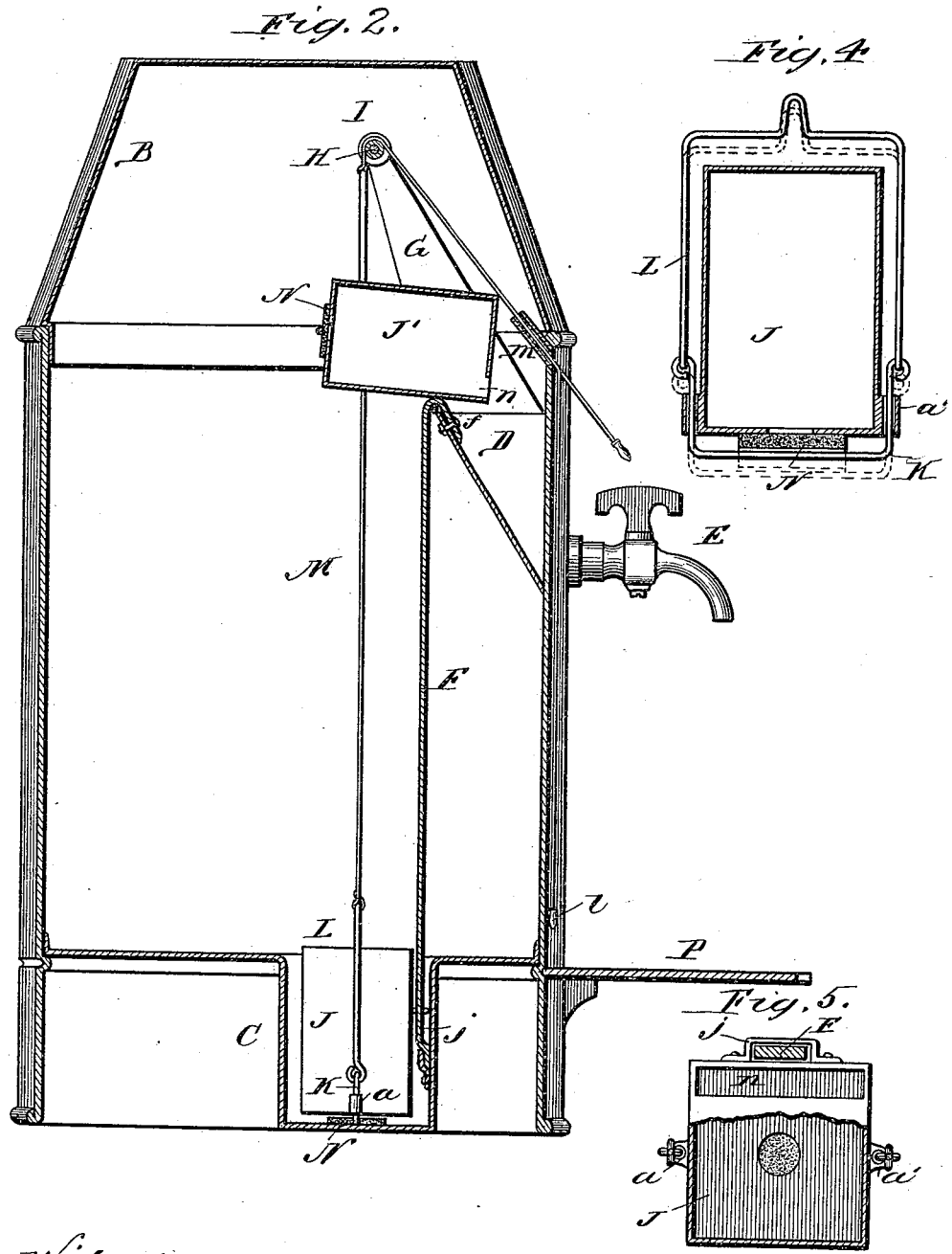

UNITED STATES PATENT OFFICE.

JOHN L. GEIER, OF CHICAGO, ILLINOIS.

MEASURING OIL-TANK.

SPECIFICATION forming part of Letters Patent No. 360,289, dated March 29, 1887.

Application filed December 20, 1886. Serial No. 222,134. (No model.)

*To all whom it may concern:*

Be it known that I, JOHN L. GEIER, a citizen of the United States of America, residing at Chicago, in the county of Cook and State of Illinois, have invented certain new and useful Improvements in Oil Tanks and Measures, of which the following is a specification, reference being had therein to the accompanying drawings.

This invention relates to oil-tanks for stores and in devices connected therewith for elevating and measuring the oil to be drawn therefrom; and it is my object to provide a simple and effective elevating and measuring apparatus that is easily operated, and which is reliable in its operation and cannot readily get out of order.

My invention therefore consists of the novel devices and combinations of devices hereinafter described and specifically claimed.

Figure 1:
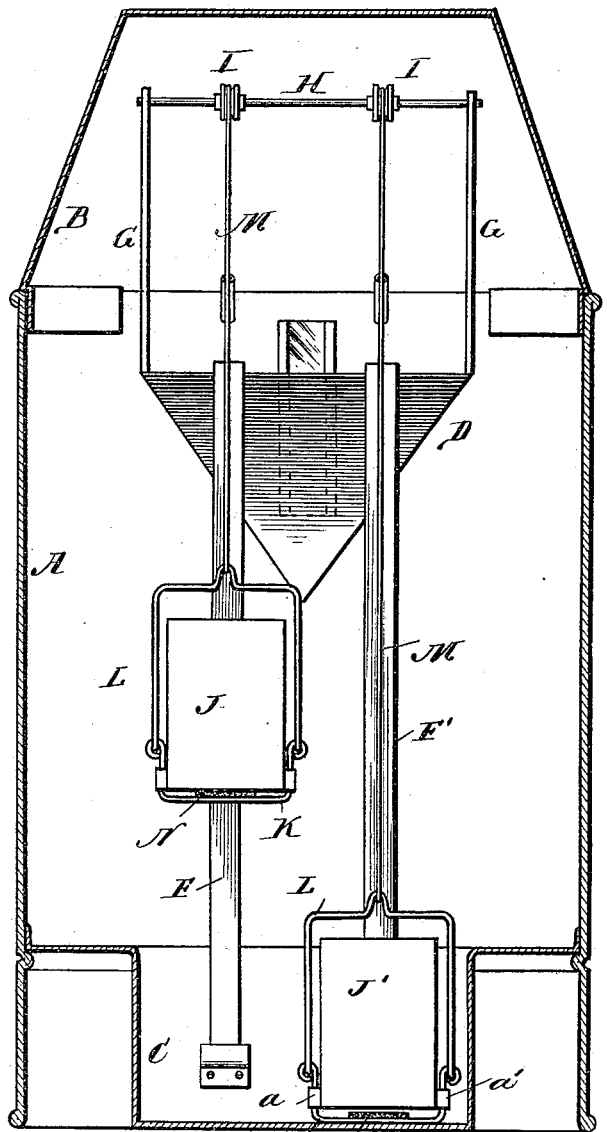
Figure 3:
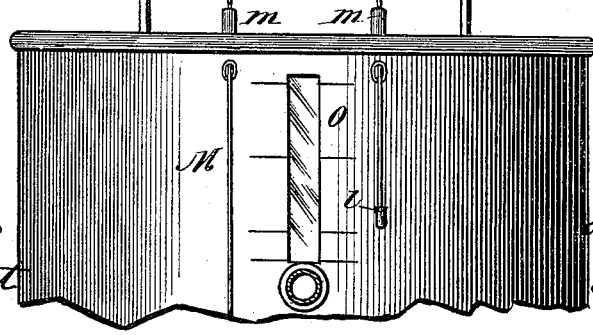

In the accompanying drawings, Figure 1 represents a longitudinal vertical section of the oil-tank; Fig. 2, a vertical cross-section, and Fig. 3 a front elevation of the upper portion of the same, the cover being removed; and Figs. 4 and 5, a vertical section and sectional plan of one of the measuring and elevating buckets.

Corresponding letters in the several figures of the drawings designate like parts.

A denotes the tank holding the oil to be retailed out, and B the conical cover for the same. The tank A has formed in its bottom a pit, C, of sufficient depth for the largest measure when inserted to be nearly submerged therein, and of a width and length to receive the several measures, and against the front of the tank, to the upper portion thereof, is formed against its interior a hopper-compartment, D, communicating with faucet E, for drawing off the contents of such hopper, which faucet E, for convenience in packing and shipping, is made detachable by being screwed into a nozzle soldered to the tank. Guide-bars F and F', inserted with their lower ends into sockets inside of pit C, extend vertically above the top edge of hopper-compartment D, where they are bent at an acute angle to lap over and into such hopper, each being detachably secured by a screw or bolt, *f*. Upon each side of hopper D is fixed a standard, G, the upper ends of which form the journal-bearings for a shaft, H, having mounted thereon pulleys I, one on line with each guide-bar F.

Buckets J and J' may be square or round, and of sizes to hold different quantities of oil, and have each a loop, *j'*, embracing one of the guide-bars F, which loops are placed slightly above the middle height of such buckets, and each tank has at its bottom, at opposite sides, eye-loops *a* and *a'*, forming guides for a U-shaped yoke, K, that has eyed ends connecting with the eyed ends of a bail, L, coupled to the end of a cord or chain, M, that is passed over one of the pulleys I, and is thence projected through a tube, *m*, fixed to the upper inward edge of the tank A. Each end of such cord or chain has a knot or handle, *l*, secured to its exteriorly-projecting end, by the pulling of which the bucket coupled to such cord or chain is elevated.

Each bucket J has a central opening in its bottom, and upon the center of each yoke K is secured a valve, N, of rubber, leather, or felt, and sufficiently large to close the bottom opening, while the top of each bucket is nearly closed, it only having a narrow opening, *n*, at the side edge toward loop *j*.

A glass plate, O, is inserted into the wall of the tank above faucet E, through which glass the contents in the hopper-compartment D can be seen, and upon or at the sides of the glass O are marked or engraved lines indicating the quantity of oil therein. Below the faucet E is removably attached to the tank a platform or shelf, P, for placing the vessel to be filled.

A certain measure of oil being desired, the bucket J, containing the amount, is elevated by pulling cord or chain M, when such bucket J, supported on yoke K, that is suspended to bail L, will rest upon valve N, that closes the bottom opening, and will be held in an upright position by loop *j*, guided on bar F, until such loop *j* reaches the upper curved end of such bar F, when with a further lift it will form the pivot around which the bucket will be tilted to discharge its contents through opening *n* into hopper D, whence the oil will be drawn off through faucet E. With releasing cord or chain M the bucket will assume its upright position again, and will move vertically downward, when, as soon as reaching the surface of the oil, the bucket will float thereon, while the valve N will drop by its own weight and by the weight of the yoke K, sliding in eye-loops $a$, for the bucket to fill through the valve-opening, and then to sink to the bottom of pit C. The advantage of this arrangement of the valve is that oil can be drawn from the tank to almost the last drop contained therein, which is impossible with a bucket that has to fill from the top, or that has to tip into the oil for filling.

The narrow opening $n$ has the advantage that oil is not spilled over so readily with shaking of the bucket while being elevated, thus insuring a perfect measure. A bucket can be readily removed when desirable by loosening screw $f$, and thereby disconnecting guide-bar F.

What I claim as my invention is—

1. The combination, with the tank provided with a pit in its bottom and with a hopper in top, of vertical guide-bars reaching from the pit to the hopper and of buckets suspended to cords or chains and having loops embracing such guide-bars, substantially as set forth.

2. The combination, with the tank provided with a pit in its bottom and with a hopper in top, of buckets, each having a central bottom opening and supported on a vertically-sliding yoke carrying a valve and suspended to a bail and cord or chain for elevating and tilting such bucket, substantially as set forth.

3. The combination, with the tank provided with a pit in its bottom and with a hopper in top, of buckets suspended on cords or chains passed over pulleys and projected through tubular perforations of the tank, each such bucket being provided with a bottom valve and with a narrow top opening, and with means for guiding and tilting such buckets, all substantially as set forth.

In testimony whereof I affix my signature in presence of two witnesses.

JOHN L. GEIER.

Witnesses:
GEORGE W. KAEPPEL,
WM. H. LOTZ.